F. R. Langwith,
Vise.
N° 15,427. Patented July 29, 1856.
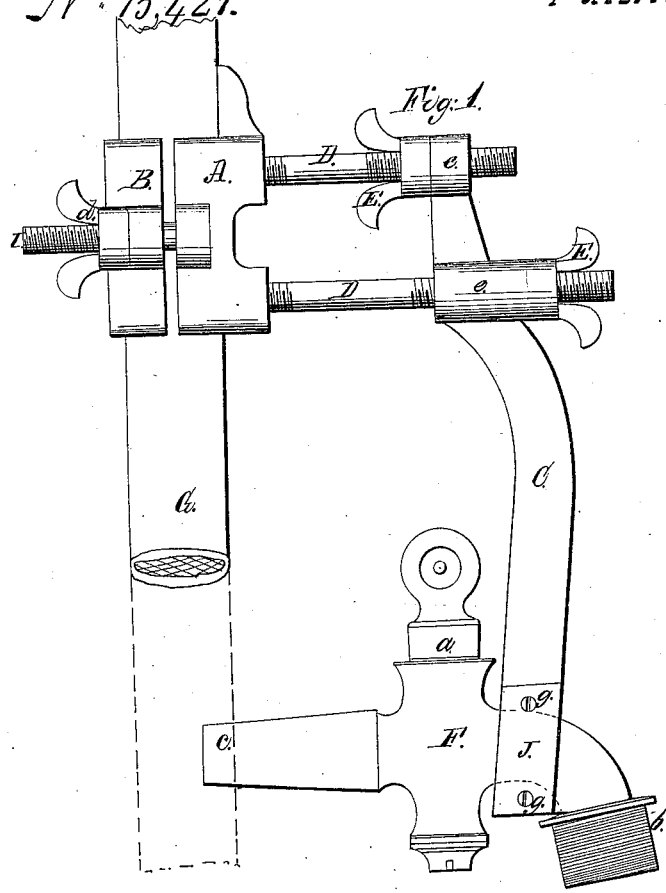
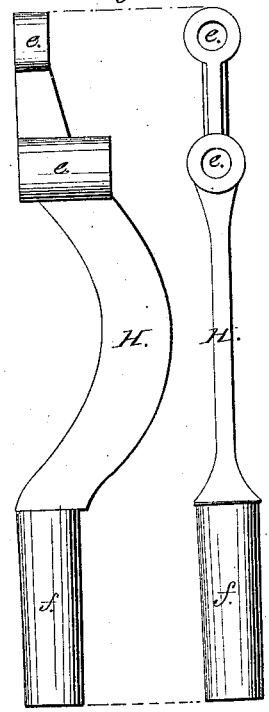
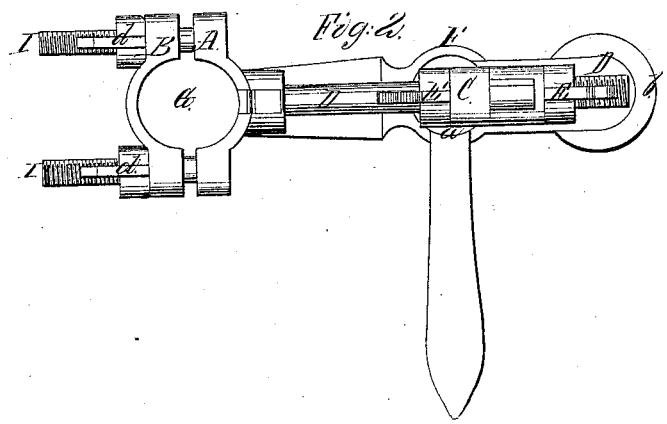

UNITED STATES PATENT OFFICE.

F. R. LANGWITH, OF NEW YORK, N. Y.

IMPROVED CLAMP FOR PLUMBERS.

Specification forming part of Letters Patent No. 15,427, dated July 29, 1856.

*To all whom it may concern:*

Be it known that I, F. R. LANGWITH, of the city, county, and State of New York, have invented a new and useful adjustable clamp for holding and retaining water-cocks in a proper position while soldering them to the pipe; and I do hereby declare the following to be a full, clear, and exact description of the same, reference being had to the accompanying drawings, figures, and letters of reference thereon, in which—

Figure 1 is a side elevation of my improved clamp, showing the manner in which it clasps the pipe and cock. Fig. 2 is an end view of it. Figs. 3 and 4 show the arm H, which is substituted for the lever C when it is desired to hold the cock by inserting the lower end, $f$, in place of the barrel of the cock $a$.

Heretofore the operation of soldering the cocks to the pipe has been a difficult and lengthy operation, especially to adjust and retain the cock in a true and perfect position as the plumber might wish.

The object of my invention is to entirely obviate these difficulties and construct a machine by the use of which as much work can be done in five minutes as could be accomplished by the old process of blocking and leveling in an hour, thus rendering perfectly easy, with the use of the clamp, what has before been difficult.

To enable others skilled in the art to make and use my invention, I will describe its construction and operation.

A B is the box which clamps the water-pipe. To this box-piece A are secured four bolts—two on the front side, I I, and two on the back side, D D—having screws cut on them, as shown in Figs. 1 and 2. On the bolts I I are nuts $d\ d$, which serve to adjust the clamp firmly upon the pipe G. On the rods D D there is placed a nut, E, inside the lever C on the upper bolt, while on the lower bolt there is a nut, E, on the outside of the lever C. This lever C is arranged with a box, J, capped by screws $g\ g$, to clamp the cock F between the nozzle $b$ and barrel $a$ at its lower end, while the upper end is arranged with holes $e\ e$ to fit upon the bolts D D, and is held thereon by the nuts. The shank of the cock enters the pipe G at $c$, Fig. 1. There is another lever, H, Figs. 3 and 4, which is used as a substitute for the lever C, and which has holes $e\ e$, as shown in Fig. 4, to fit the bolts D D, while the lower end has a plug, $f$, to fit the barrel of the cock. Of course the barrel of the cock $a$ is removed to admit in its place the plug $f$, when this lever is used, which is adjusted to hold the cock in a proper position, the same as lever C, by the screws E E.

Operation: The pipe is clasped by the box A B, while the lever H is inserted in place of the barrel $a$ of the cock F. If, however, the lever C is used, it will clasp the cock at its lower end by the box J, as shown plainly in Fig. 1, and by the nuts E E on the bolts D D, acting on the levers H or C, can be adjusted and firmly held while soldering the shank of the cock to the pipe at $c$.

Having thus described my improved clamp, I claim—

The combination and arrangement of the clamp-box A B, the clamping-levers C and H, (when either is used,) and also in combination therewith the screws for adjusting the cock in a proper position during the process of soldering with the main pipe, when arranged and operating substantially as described.

F. R. LANGWITH. [L. S.]

Witnesses:
C. A. DURGIN,
LAWSON A. LONG.